(12) United States Patent
Bender et al.

(10) Patent No.: US 11,461,674 B2
(45) Date of Patent: Oct. 4, 2022

(54) VEHICLE RECOMMENDATIONS BASED ON DRIVING HABITS

(71) Applicant: Kyndryl, Inc., New York, NY (US)

(72) Inventors: Michael Bender, Rye Brook, NY (US); Rhonda L. Childress, Austin, TX (US); Kim A. Eckert, Austin, TX (US); Minh Q. Pham, Austin, TX (US)

(73) Assignee: Kyndryl, Inc., New York, NY (US)

( * ) Notice: Subject to any disclaimer, the term of this patent is extended or adjusted under 35 U.S.C. 154(b) by 1192 days.

(21) Appl. No.: 15/967,680

(22) Filed: May 1, 2018

(65) Prior Publication Data

US 2019/0340519 A1 Nov. 7, 2019

(51) Int. Cl.
*G06N 5/04* (2006.01)
*G07C 5/08* (2006.01)
*G06N 20/00* (2019.01)

(52) U.S. Cl.
CPC .............. *G06N 5/04* (2013.01); *G06N 20/00* (2019.01); *G07C 5/0808* (2013.01)

(58) Field of Classification Search
CPC . G06N 5/04; G06N 20/00; G06N 3/08; G07C 5/0808; G07C 5/085; G07C 5/008
See application file for complete search history.

(56) References Cited

U.S. PATENT DOCUMENTS

| | | | |
|---|---|---|---|
| 7,627,452 B2 | 12/2009 | Albrecht et al. | |
| 8,731,977 B1 | 5/2014 | Hardin et al. | |
| 8,831,922 B2 | 9/2014 | Sakakibara et al. | |
| 9,043,079 B2 | 5/2015 | Tsuchikiri et al. | |
| 2002/0104323 A1* | 8/2002 | Rash | F24F 11/30 62/176.1 |
| 2006/0155439 A1 | 7/2006 | Slawinski et al. | |
| 2006/0271255 A1 | 11/2006 | Stott et al. | |
| 2014/0018999 A1* | 1/2014 | Adams | B60W 40/06 701/31.4 |
| 2014/0310186 A1 | 10/2014 | Ricci | |
| 2016/0306903 A9 | 10/2016 | Teravainen et al. | |
| 2017/0352082 A1* | 12/2017 | Aziz | G07C 5/008 |
| 2018/0229744 A1* | 8/2018 | Manzari | B61L 15/0027 |

(Continued)

OTHER PUBLICATIONS

O. Ciszak, "Investigation and Rationalization of Assembly System Productivity using the "Mean Time Between Failures" Parameter", Proceedings of the Eighth International Conference on Engineering Computational Technology, ECT, vol. 100, Jan. 2012, 8 pages.

*Primary Examiner* — Michael V Kerrigan
(74) *Attorney, Agent, or Firm* — Erik Swanson; Hunter E. Webb; Keohane & D'Alessandro PLLC

(57) ABSTRACT

Disclosed embodiments provide techniques for providing vehicular recommendations based on driver habits. Embodiments utilize a variety of input data, including, but not limited to, static vehicular data, dynamic vehicular data, and/or environmental data. In embodiments, empirical rules are used to adjust recommended maintenance schedules based on the input conditions. Additionally, the adjusted recommendations along with unscheduled maintenance data are input to a machine learning system, such as a neural network. The machine learning system is used to further revise the maintenance schedule, estimate end of life of the vehicle, and issue recommendations for when to sell a vehicle and recommendations on attributes of a new vehicle for acquisition.

20 Claims, 6 Drawing Sheets

(56) References Cited

U.S. PATENT DOCUMENTS

2019/0080524 A1* 3/2019 Tucker ................. G07C 5/0841
2019/0385385 A1* 12/2019 Davidson ............... G07C 5/008
2020/0013237 A1* 1/2020 Kanbe .................... G07C 5/006

* cited by examiner

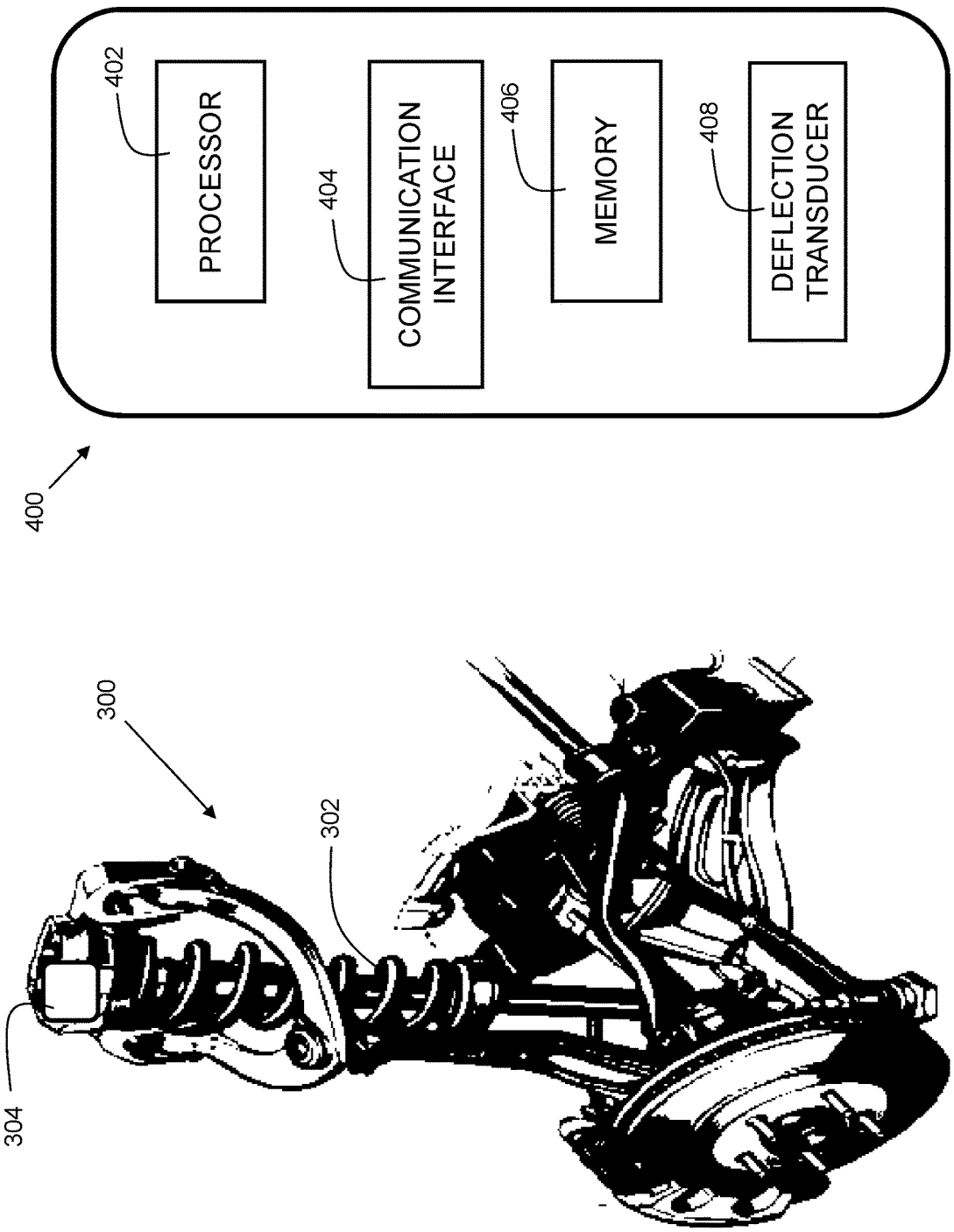

VEHICLE RECOMMENDATIONS BASED ON DRIVING HABITS

FIELD OF THE INVENTION

The present invention relates analyzing vehicle data and, more particularly, to methods and systems for vehicle recommendations based on driving habits.

BACKGROUND

The useful life of a motor vehicle is affected by a multitude of factors. It is important to be able to calculate the useful life and required maintenance. A person may own a vehicle and need to know accurately when to get the vehicle services. In addition, the person may want to sell the vehicle prior to its value dipping below a particular number. Heretofore, there has not been a reliable method of achieving this.

SUMMARY

In one embodiment, there is provided a computer-implemented method for generating a vehicle report for a vehicle, comprising: obtaining static vehicular data for the vehicle; obtaining dynamic vehicular data for the vehicle; obtaining environmental data associated with the vehicle; computing a maintenance score based on the static vehicular data, dynamic vehicular data, and environmental data; obtaining a maintenance procedure for the vehicle; adjusting an interval associated with the maintenance procedure based on the maintenance score; and providing the adjusted interval in the vehicle report.

In another embodiment, there is provided an electronic computing device comprising: a processor; a memory coupled to the processor, the memory containing instructions, that when executed by the processor, perform the steps of: obtaining static vehicular data for a vehicle; obtaining dynamic vehicular data for the vehicle; obtaining environmental data associated with the vehicle; computing a maintenance score based on the static vehicular data, dynamic vehicular data, and environmental data; obtaining a maintenance procedure for the vehicle; adjusting an interval associated with the maintenance procedure based on the maintenance score; obtaining unscheduled maintenance data, inputting the unscheduled maintenance data into a machine learning system as training data; inputting the static vehicular data, dynamic vehicular data, and environmental data for the vehicle into the machine learning system; and generating a vehicular recommendation for the vehicle from the machine learning system.

In yet another embodiment, there is provided a computer program product for an electronic computing device comprising a computer readable storage medium having program instructions embodied therewith, the program instructions executable by a processor to cause the electronic computing device to: obtain static vehicular data for a vehicle; obtain dynamic vehicular data for the vehicle; obtain environmental data associated with the vehicle; compute a maintenance score based on the static vehicular data, dynamic vehicular data, and environmental data; obtain a maintenance procedure for the vehicle; adjust an interval associated with the maintenance procedure based on the maintenance score; obtain unscheduled maintenance data; input the unscheduled maintenance data into a machine learning system as training data; input the static vehicular data, dynamic vehicular data, and environmental data for the vehicle into the machine learning system; and generate a vehicular recommendation for the vehicle from the machine learning system.

BRIEF DESCRIPTION OF THE DRAWINGS

Features of the disclosed embodiments will be more readily understood from the following detailed description of the various aspects of the invention taken in conjunction with the accompanying drawings.

FIG. 3 shows a portion of a vehicle suspension with a suspension deflection sensor.

FIG. 4 is a block diagram of a suspension deflection sensor in accordance with embodiments of the present invention.

Figure 1:
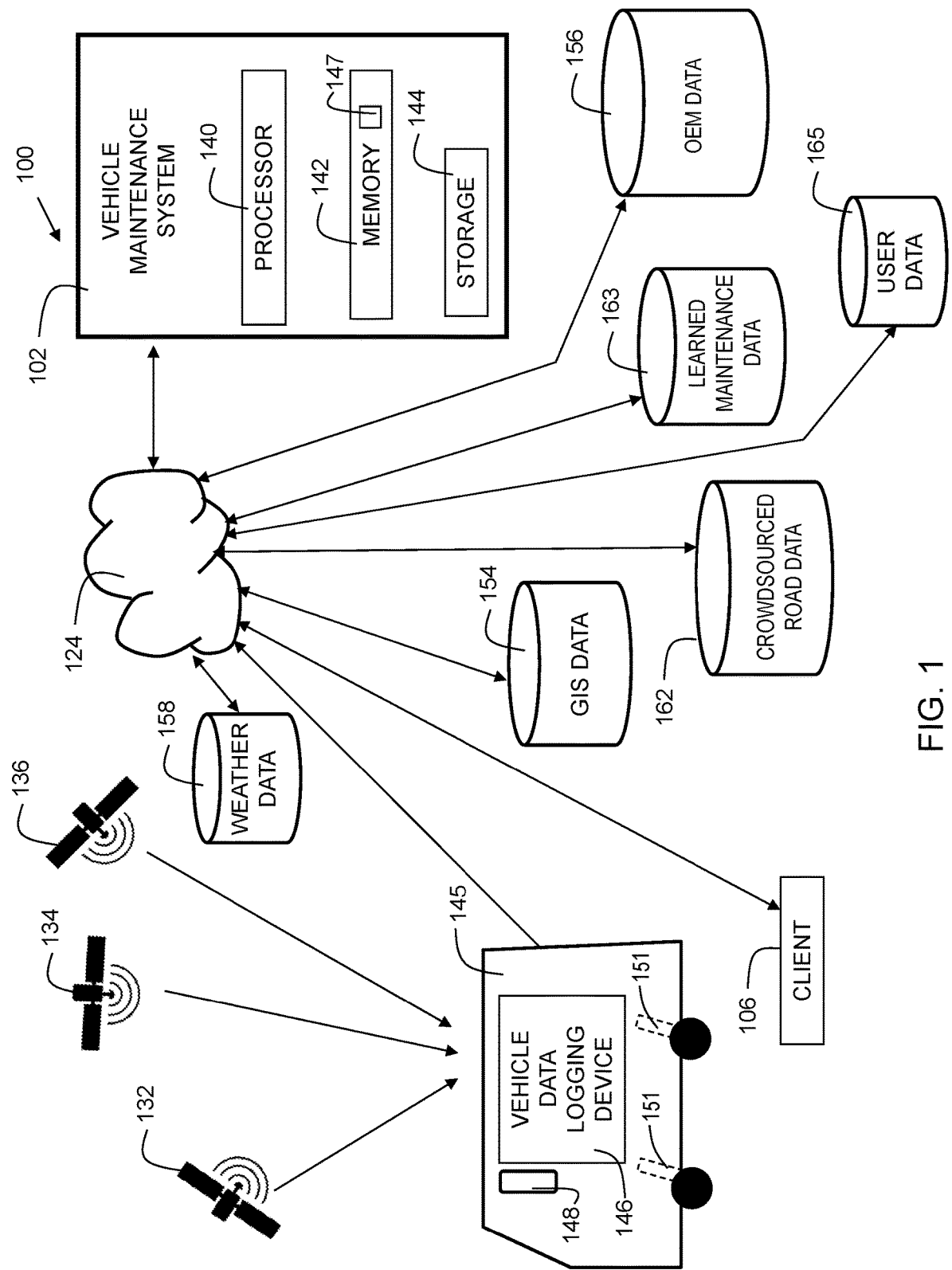
FIG. 1 is a diagram of an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for providing vehicular recommendations based on driver habits. Embodiments utilize a variety of input data, including, but not limited to, static vehicular data, dynamic vehicular data, and/or environmental data. Static vehicular data includes characteristics inherent to the vehicle, such as size, number of cylinders, number of axles, etc. Dynamic vehicular data includes data pertaining to how the vehicle is operated, such as braking style, average payload, road conditions on which the vehicle is operated, and other usage characteristics. Environmental data includes data regarding the climate where the vehicle is typically operated, and can include factors such as altitude and/or humidity. In embodiments, empirical rules are used to adjust recommended maintenance schedules based on the input conditions. Additionally, the adjusted recommendations along with unscheduled maintenance data are input to a machine learning system, such as a neural network. The machine learning system is used to further revise the maintenance schedule, estimate end of life of the vehicle, and issue recommendations for when to sell a vehicle, and recommendations on attributes of a new vehicle for acquisition.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is a diagram 100 of an environment for embodiments of the present invention. Vehicle maintenance system 102 includes processor 140, memory 142, and storage 144. Memory 142 contains instructions 147 thereon, which when executed by the processor 140 executes elements of embodiments of the invention. System 102 is in communication with other devices in the environment via network 124. Network 124 may be the Internet, a wide area network, a local area network, a cloud computing network, or any other suitable network.

Vehicle 145 is in communication with system 102 via network 124. The vehicle may be any type of motorized (or in some cases, unmotorized, such as a bicycle) vehicle, such as a car, motorcycle, van, truck, golf cart, etc. A vehicle data logging device 146 is included within or on the vehicle to log data about the driving of the vehicle. Reference number 151 represents the vehicle suspension, which may be used to track dynamic vehicle data such as payload and road conditions. The vehicle data logging device 146 may collect the data from the active vehicle suspension 151. In some embodiments, the vehicle suspension may be an active vehicle suspension. In some embodiments, the vehicle suspension system may not be an active vehicle suspension, but may still include deflection sensors to report deflection data. Deflection data pertains to how much the suspension is deflected (compressed) during operation. Loading the vehicle with heavy cargo deflects the suspension. Thus, deflection data can be indicative of how much the vehicle is loaded (e.g., with passengers and/or cargo). Additionally, rough roads (e.g., potholes) can cause rapid deflections of the suspension. Thus, patterns within the deflection data can also be used to infer the quality of roads on which the vehicle is operated. These factors can be used in determining more accurate maintenance schedules for the vehicle.

The vehicle data logging device 146 is in communication with satellites 132, 134, and 136. These satellites can be GPS, GLONASS, Galileo, or any other suitable system now known or hereafter developed. Note that while three satellites are depicted in FIG. 1, in practice, the vehicle data logging device 146 can communicate with more than three satellites concurrently in some embodiments.

Device 148 represents a personal computing device of a person in the vehicle 145, such as a smartphone, tablet computer, laptop computer, personal digital assistant (PDA), etc. Client 106 may be a computing device as well (such as a smartphone or computer), which may be inside or outside of the vehicle 145.

Geolocation information system (GIS) database 154 stores GIS data such as maps, terrain characteristics (hilly, coastal, mountain, flatland, field, desert, etc.), topology, altitude, and other suitable data. In some embodiments, obtaining environmental data includes obtaining terrain data from the GIS database 154.

Database 156 stores original equipment manufacturer (OEM) data direct from vehicle manufacturers, for example, Ford, Toyota, Audi, etc. about vehicles made by the respective manufacturers.

Database 162 stores crowdsourced road data regarding road conditions. Conditions may include the presence of potholes, roadwork, malfunctioning traffic signal, an accident, a disabled vehicle, traffic jam, etc. Applications for aggregating such data exist, such as Waze.

Database 158 stores weather data. This data may include temperatures, humidity levels, snowfall, rainfall, etc. The data may be aggregated as averages, medians, etc. for particular months, seasons, weeks, etc. This data may be useful as weather conditions affect the life of a vehicle. For example, driving frequently in heavy snow can accelerate the need for transmission maintenance.

Database 165 stores vehicle maintenance data for user vehicles. This data may include, for example, dates and details of the last service, belt change, oil change, suspension check, filter change, etc.

Database 163 stores learned maintenance data, which is the output of the machine learning that is performed by vehicle maintenance system 102. This data may be based on an analysis of maintenance data, weather conditions, road conditions, performed maintenance data, original equipment specifications, etc.

Based on all the acquired data, a maintenance score may be derived. In embodiments, the maintenance score S may be derived as:

$$S = K_1 F_1 + K_2 F_2 + K_n F_n$$

Where $K_1$-$K_n$ are constants, and $F_1$-$F_n$ are functions.

The functions may be mathematical representations for a given parameter, such as mileage, average operating temperature, and/or other vehicle parameters. The constants may be selected to result in a score S that exceeds a predetermined threshold to indicate that a vehicle maintenance schedule should be revised. As an example, if mileage is higher than expected, the score S may then be of a value exceeding a predetermined threshold, signifying a need for accelerated maintenance schedules. Thus, embodiments include adjusting an interval associated with a maintenance procedure based on the maintenance score.

Figure 2:
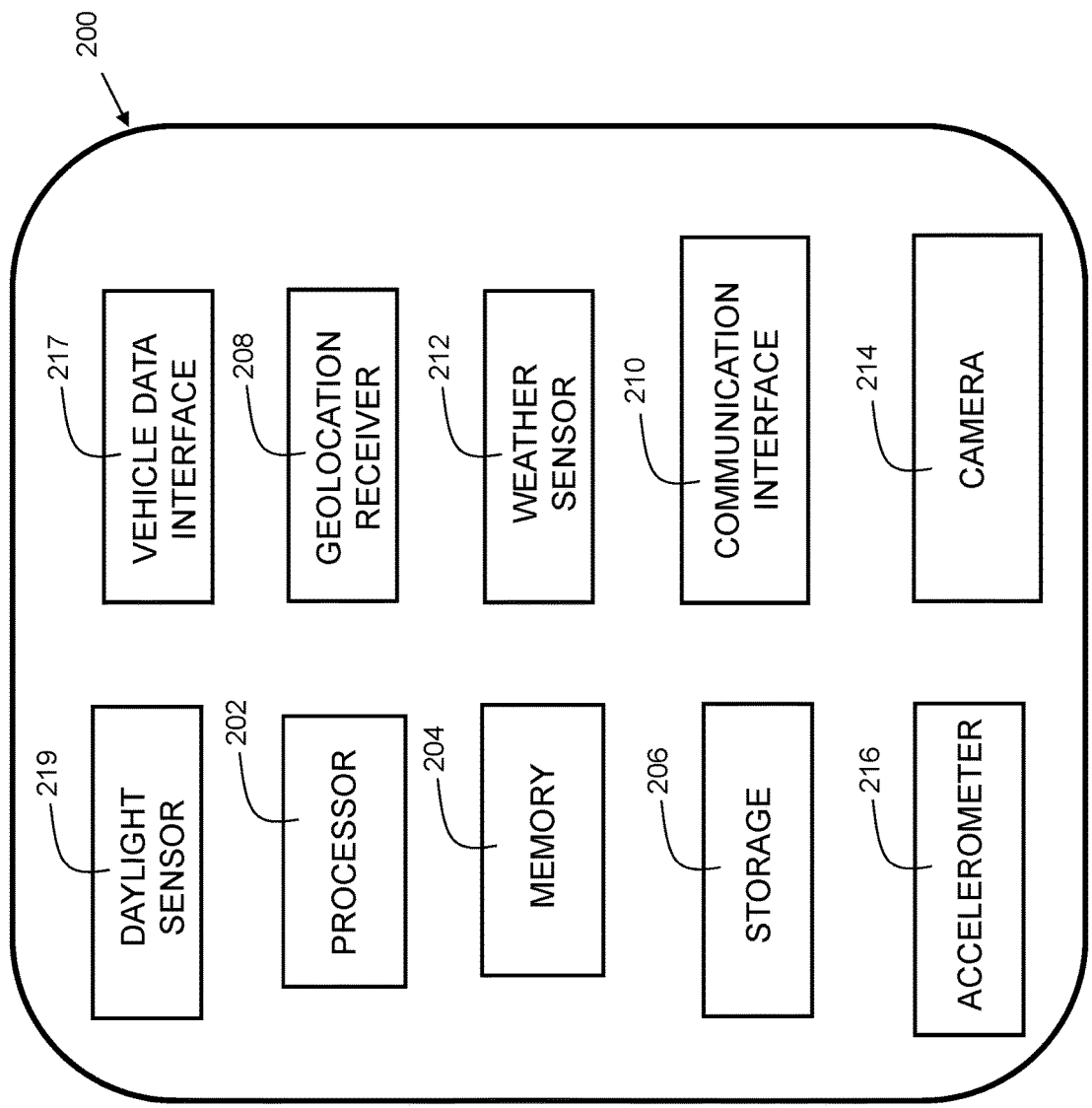
FIG. 2 is a block diagram of a device in accordance with embodiments of the present invention.

FIG. 2 is a block diagram of a device in accordance with embodiments of the present invention. Device 200 is an electronic computing device. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se.

Memory 204 stores instructions, which when executed by the processor, implement the steps of the present invention.

Device 200 may further include storage 206. In embodiments, storage 206 may include one or more magnetic storage devices such as hard disk drives (HDDs). Storage 206 may additionally include one or more solid state drives (SSDs).

Device 200 further includes geolocation receiver 208. This may operate with global positioning satellite systems, such as GPS, GLONASS, Galileo or other suitable system.

The device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network.

Device 200 further includes weather sensor 212. The weather sensor 212 represents at least one sensor for temperature, precipitation, humidity, salinity, altitude, or other.

Device 200 may further include camera 214. The camera may be integral with the device as shown, or connected thereto via a wired or wireless connection.

The device 200 may further include an accelerometer 216. The accelerometer may be capacitive, piezoelectric resistive, capacitive spring mass system base, DC response, electromechanical servo based, high gravity, high temperature, a laser accelerometer, or other type now known or hereafter developed.

The device 200 may further include vehicle data interface 217. This can include an OBD II interface, enabling reception of various vehicle parameters such as engine operating parameters. The vehicle data interface 217 can additionally/alternatively include a CAN bus interface to receive messages from various vehicle microcontrollers to obtain information regarding braking, acceleration, steering, and/or other vehicle parameters.

The device may further include a daylight sensor 219. In embodiments, the daylight sensor utilizes a photoelectric sensor to generate a signal in response to ambient light above a predetermined threshold. In some embodiments, the daylight sensor 219 may be used to infer if a vehicle is stored indoors during the day (e.g., in a garage), or outdoors. A garage-kept vehicle may have longer maintenance cycles for certain types of maintenance and/or parts replacement.

FIG. 3 shows a portion of a vehicle suspension 300 with a suspension deflection sensor 304. In some embodiments, obtaining dynamic vehicle data includes obtaining suspension deflection data. The sensor collects data from the suspension 300. The spring 302 of suspension 300 is more compressed when carrying heavier loads than lighter ones. By measuring deflection data, it can be determined whether the driver has the car loaded full or lightly loaded. The data also reflects driving conditions, as significant bumps and/or depressions in a road surface can cause the springs to rapidly compress and decompress. This can affect, for example, brake life, as heavy load wears out brakes more quickly than do lighter loads.

In some embodiments, obtaining suspension deflection data includes obtaining average suspension deflection data. This measures an average load of the vehicle over a particular period of time (e.g., one year). In some embodiments, obtaining suspension deflection data includes obtaining the median suspension deflection data for a particular period of time (e.g., six months).

In some embodiments, obtaining suspension deflection data includes obtaining significant deflection event data. A significant deflection event means deflection of more than a predetermined threshold (e.g., a really hard bump). Driving over a large pothole could qualify as a significant deflection event, and it can wear out tires and suspension quicker.

FIG. 4 is a block diagram of a suspension deflection sensor in accordance with embodiments of the present invention. This is a block diagram of components of sensor 304 of FIG. 3. Sensor 400 is used to assess average payload, such as how many passengers or how much cargo is typically carried, etc. Generally, more cargo means a replacement for brakes and shocks will be required sooner than if less cargo were carried. In addition, significant deflections, such as driving on rough terrain or through many potholes, can accelerate a requirement for maintenance as compared to driving on a substantially smooth and flat road.

Sensor 400 includes a processor 402, which is coupled to a memory 406.

Memory 406 may include dynamic random access memory (DRAM), static random access memory (SRAM), magnetic storage, and/or a read only memory such as flash, EEPROM, optical storage, or other suitable memory. In some embodiments, the memory 406 may not be a transitory signal per se. Memory 406 stores instructions, which when executed by the processor, implement the steps of the present invention.

Sensor 400 includes a deflection transducer 408. This converts variations in a physical quantity, such as pressure (from payload or road bumps, etc.), into an electrical signal, or vice versa.

Sensor 400 further includes a communication interface 404. Communication interface 404 may include a wired or wireless data interface, enabling deflection data to be transmitted to the vehicle data logging device (146 of FIG. 1), client 106 (FIG. 1), and/or other computing devices. In some embodiments, the communication interface 404 may include a serial interface (UART), CAN bus interface, or other electronic communication interface.

Figure 5:
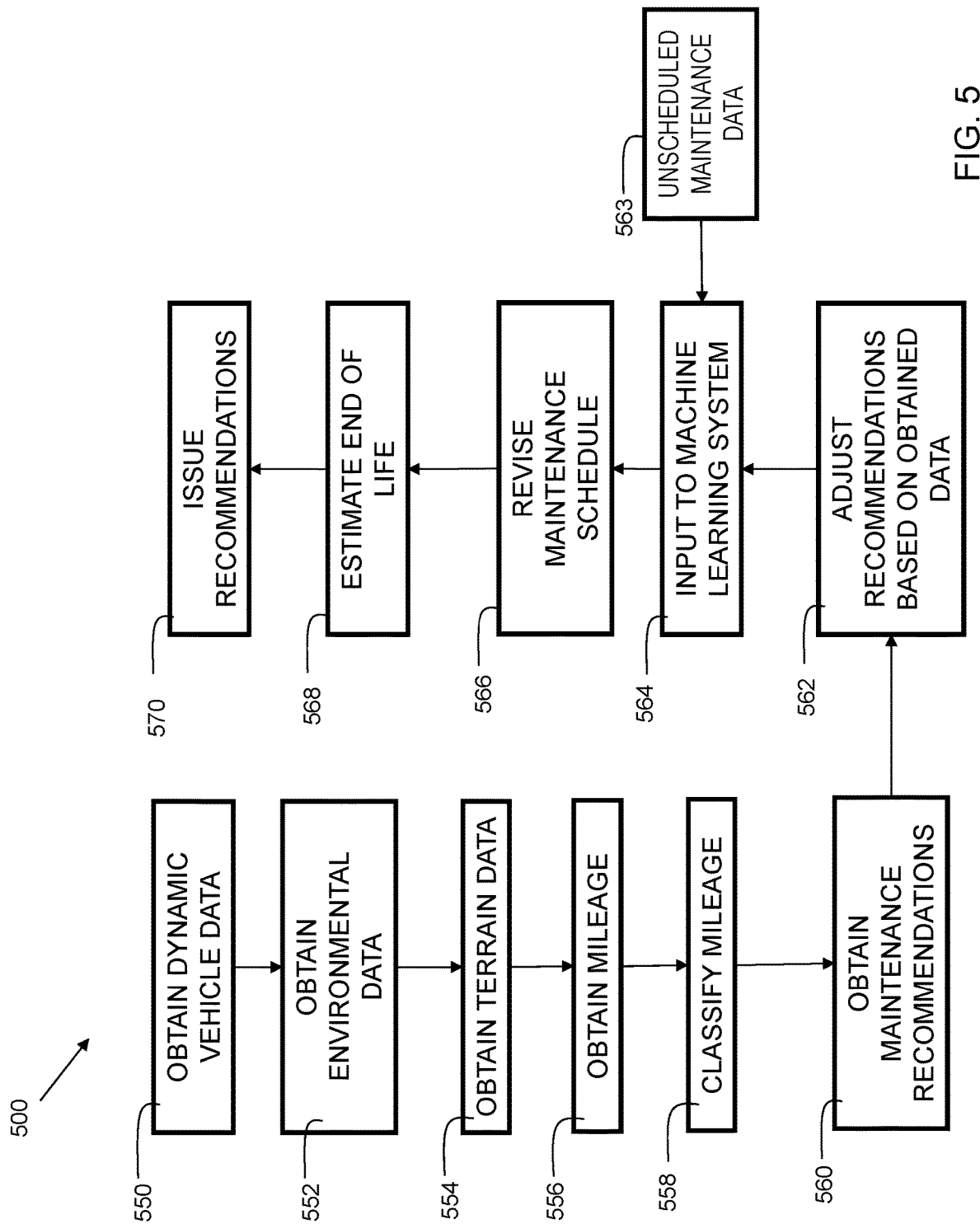
FIG. 5 is a flowchart showing process steps for embodiments of the present invention.

FIG. 5 is a flowchart 500 showing process steps for embodiments of the present invention. At 550, dynamic vehicle data such as data based on driving habits is obtained. For example, this may include recording whether brakes are applied forcefully by the user, or whether the user consistently causes the vehicle to accelerate at a high rate, etc. Thresholds may be preset for differentiating among measurements of such data. These types of driving habits can wear out brakes and damage the transmission over time.

In some embodiments, obtaining dynamic vehicle data includes obtaining engine data. This may be from OBD-II via interface 217 of FIG. 2 or other sensors. An OBD (on-board diagnostic) system detects malfunctions of a vehicle on which the system is installed. The OBD-II standard specifies the type of diagnostic connector and its pinout, the electrical signaling protocols available, and the messaging format. In addition, it provides a candidate list of vehicle parameters to monitor and how to encode the data for each.

In some embodiments, obtaining engine data includes obtaining average revolutions-per-minute data. If the revolutions per minute are high, it may be recommended that the user replace the current vehicle with one having an engine with more cylinders. For example, if the user tends to push a 4-cylinder vehicle to the maximum recommended RPM limit, a recommendation may be issued to replace with a 6 or 8-cylinder engine vehicle (as they have different limits and operating ranges than a 4-cylinder engine vehicle).

In some embodiments, obtaining engine data includes obtaining average idle time data. If there is a significant amount of idling time (i.e., above a predetermined threshold) detected over time, it may be recommended that the vehicle be replaced with a hybrid or electric vehicle for the next purchase.

At 552, environmental data is obtained. Various types of environmental and climate conditions can affect the life of a vehicle. The weather sensor 212 of FIG. 2 can be implemented as at least one sensor for temperature, precipitation, humidity, salinity, altitude, storage (i.e., indoors/outdoors), or other condition.

In some embodiments, obtaining environmental data includes obtaining ambient temperature data. Temperature can affect life of vehicle components such as gaskets and belts, as well as oil and other key fluids (brake, transmission), and batteries.

In some embodiments, obtaining environmental data includes obtaining ambient humidity data. Humidity can affect life of components such as gaskets and belts. Lower humidity levels usually will provide for a longer life of the vehicle.

In some embodiments, obtaining environmental data includes obtaining airborne salinity data. Salt can affect life of electronic components, connectors, and sensors, etc. Lower airborne salinity levels usually will provide for a longer life of a vehicle. In some embodiments, airborne salinity data may be retrieved from a networked database, such as from the National Oceanic and Atmospheric Administration (NOAA). NOAA maintains airborne salinity data obtained from a Scanning Low-Frequency Microwave Radiometer (SLFMR) system. In other embodiments, salinity data may be obtained locally via a salinity detector on board a vehicle. In some embodiments, the salinity detector may include a wet candle chloride apparatus.

In some embodiments, obtaining environmental data includes obtaining altitude data. This data may be obtained from a geolocation receiver, such as 208 of FIG. 2, an altimeter, or other suitable technique. Altitude can affect tires and fuel systems, as air pressure, among other things, change as altitude increases or decreases.

In some embodiments, obtaining environmental data includes obtaining storage data. An inference of whether a vehicle is stored indoors or outdoors may be based on data from the daylight sensor 219 and weather sensor 212 (for temperature and/or precipitation) of FIG. 2. Storing a vehicle in a garage when not in use will typically extend the life of the vehicle as opposed to storage outside. This especially makes a difference in cold climates where keeping the vehicle above freezing can extend the life of the vehicle. Shielding the vehicle from weather elements will enhance the life of a vehicle by preventing rust and reducing freeze cycles that the vehicle is exposed to.

At 554, terrain data is obtained. Smooth flat terrain will provide a longer vehicle life as opposed to terrain which is hilly, bumpy, or full of potholes. Terrain data may be obtained from geolocation receiver 208 of FIG. 2. It may track where the user typically drives and associate it with the terrain of such area(s). An average or other aggregation may be accumulated and analyzed for a particular period of time.

At 556, mileage is obtained. At 558, mileage is classified, such as highway, city, mix, etc. It is well known that city driving is more taxing on a vehicle than highway driving due to the larger number of stops. Mileage data may be obtained from a vehicle odometer, as well as geolocation receiver 208 of FIG. 2. The odometer may calculate the number of miles driven, or driven over a period of time. The geolocation sensor may track where the user typically drives and associate it with highway, city, etc. An average or other aggregation may be accumulated and analyzed for a particular period of time.

At 560, maintenance recommendations are obtained from the original equipment manufacturer (OEM). The OEM typically provides recommendations for each model vehicle. These can be input into the system manually, or scraped from an online vehicle owner manual or similar item.

At 562, the maintenance recommendations may be adjusted based on obtained data. For example, an OEM may recommend an oil change every six months based on a typical drive of 3,000 miles in six months. However, as an example, embodiments detect that the user drives the vehicle about 6,000 miles in less than six months. In response, the maintenance recommendation may be adjusted accordingly to an oil change every three months.

At 563, unscheduled maintenance data is obtained. This data may be information on unplanned repairs. For example, instances of timing belt breaks can be fed to a machine learning system to train the machine learning system, enabling it to make better recommendations in the future.

At 564, the adjusted maintenance recommendations and unscheduled maintenance data are input to a machine learning system. The machine learning system could be an artificial neural network (ANN). The basis of an ANN is a set of interconnected nodes referred to as artificial neurons (modeled after biological neurons in an animal brain). Each connection (modeled after a synapse) between artificial neurons can send a signal from one to another. The artificial neuron that obtains the signal from another can process it and then signal yet other artificial neurons connected to it. At 566, the maintenance schedule is revised based on an output of the machine learning analysis.

At 568, an end of life for the vehicle is estimated. End of vehicle life may be based on when the vehicle will cease to be operable (no longer in working condition), but in other embodiments, it may be based on another measurement. For example, vehicle life may be based on when costs of maintenance exceed the value of vehicle (i.e., an end of "useful" life).

At 570, recommendations are issued. The recommendations will typically be generated with the objective of extending the life of the vehicle or objective of selling the vehicle prior to its value extending below a predetermined sum. For example, a user may set that he wants to sell the vehicle for at least $8,000. Embodiments may use this number on which to base recommendations. These are example objectives, and other objectives may be included in implementations.

Accordingly, embodiments may include obtaining unscheduled maintenance data, inputting unscheduled maintenance data into a machine learning system as training data; inputting the static vehicular data, dynamic vehicular data, and environmental data for the vehicle into the machine learning system; and generating a vehicular recommendation for the vehicle for the machine learning system.

Figure 6:
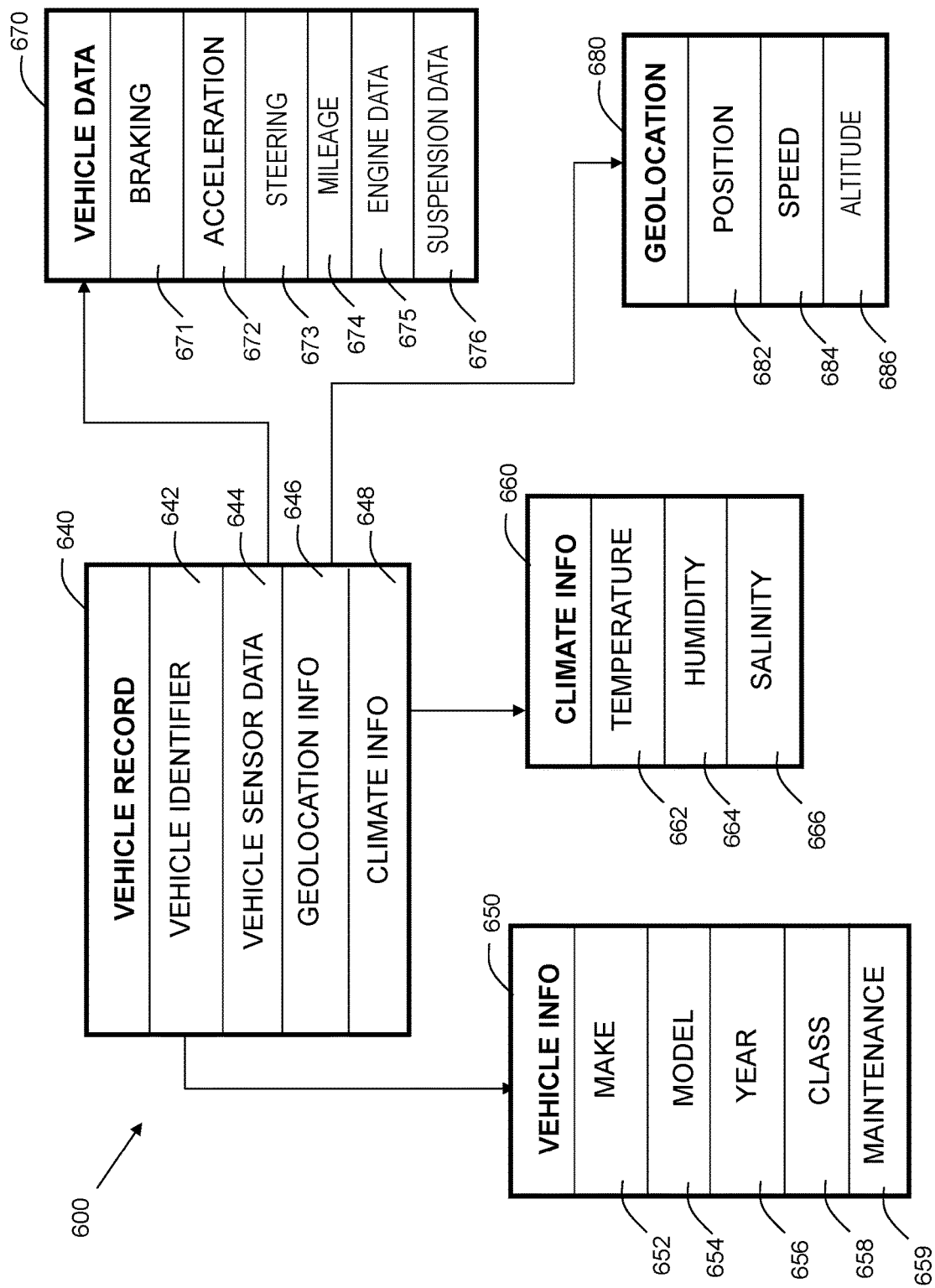
FIG. 6 shows data structures for embodiments of the present invention.

FIG. 6 shows an example 600 of data structures for embodiments of the present invention. Five example data tables are shown in a relational database. It should be recognized that the data tables and fields are examples, and in embodiments, any suitable data tables, database, configuration, and fields may be included.

Table 640 includes data related to a vehicle record. Field 642 includes a vehicle identifier. This is an alphanumeric or symbolic code which is unique to a particular vehicle. In an example, it could be a VIN.

Field 644 includes vehicle sensor data. The data may be captured from a sensor such as 400 described in FIG. 4. Field 646 includes geolocation information. This data may be captured from a geolocation receiver such as 208 of FIG. 2. Field 648 includes climate information. This data may be captured from radar systems or weather sensors, such as humidity, salinity, temperature, etc.

Table 650 includes data related to vehicle information. Field 652 includes vehicle make. This is the brand/company that makes the vehicle (e.g., Honda). Field 654 includes the vehicle model (e.g., Civic). Field 656 includes a vehicle year. This is the model year of the vehicle. Field 658 includes a vehicle class. Vehicle class is the type of vehicle, such as sedan, van, sport utility vehicle, truck, etc. Field 659 includes maintenance data comprising records of previous repairs performed on the vehicle.

Table 660 includes climate information. Field 662 includes temperature readings. Field 664 includes humidity measurements. Field 666 includes salinity measurements. Humidity and airborne salinity can affect maintenance on sensitive electronics such as airbag activation systems. Water and salt cause rust, corrosion, and can damage electronics over time.

Table 670 includes data related to vehicle sensors. Field 671 includes captured braking events from when the vehicle travels. For example, unusually quick braking may be detected. Field 672 includes captured acceleration events. For example, rapid acceleration events may be detected. Field 673 includes captured steering events. For example, a fast change of direction may be detected. This information may be acquired from the speed sensor 212 and/or vehicle data interface 217 shown in FIG. 2. Field 674 includes mileage information retrieved from the vehicle odometer. Field 675 includes engine data, such as maximum RPM, average RPM, average operating temperature, number of hours of operation, average oil pressure, and other engine parameters. Field 676 includes suspension data, such as average deflection data, maximum deflection data, and/or other suspension parameters.

Other behaviors can be included in table 670. These behaviors can include, but are not limited to, speeding (travelling at speeds in excess of posted speed limits), frequent acceleration, frequent braking, excessive speed in a curve, acceleration before a curve, over-braking before exiting a curve, and/or harsh steering. The rapid acceleration indication can be classified as an indication of a change in speed that exceeds a predetermined threshold over a given time duration. The harsh steering indication can be classified as an indication of a number of steering adjustments that exceeds a predetermined threshold over a given time duration. The curve over-braking indication can be classified as an indication of a number of hard and/or long braking instances that exceeds a predetermined threshold over a given time duration while the steering angle exceeds a predetermined number of degrees. Other driver behaviors may also be included in embodiments of the present invention.

Table 680 includes data related to geolocation. Field 682 includes position information such as latitude and longitude data. Field 684 includes speed. Field 686 includes altitude. This records the average height above sea level during operation of the vehicle. As an example, a vehicle operated primarily in Florida operates near sea level, while a vehicle operated in Wyoming may operate primarily in a range of 4,000 to 6,000 feet above sea level. In some cases, the higher altitude may impact maintenance schedules for the vehicle.

Figure 7:
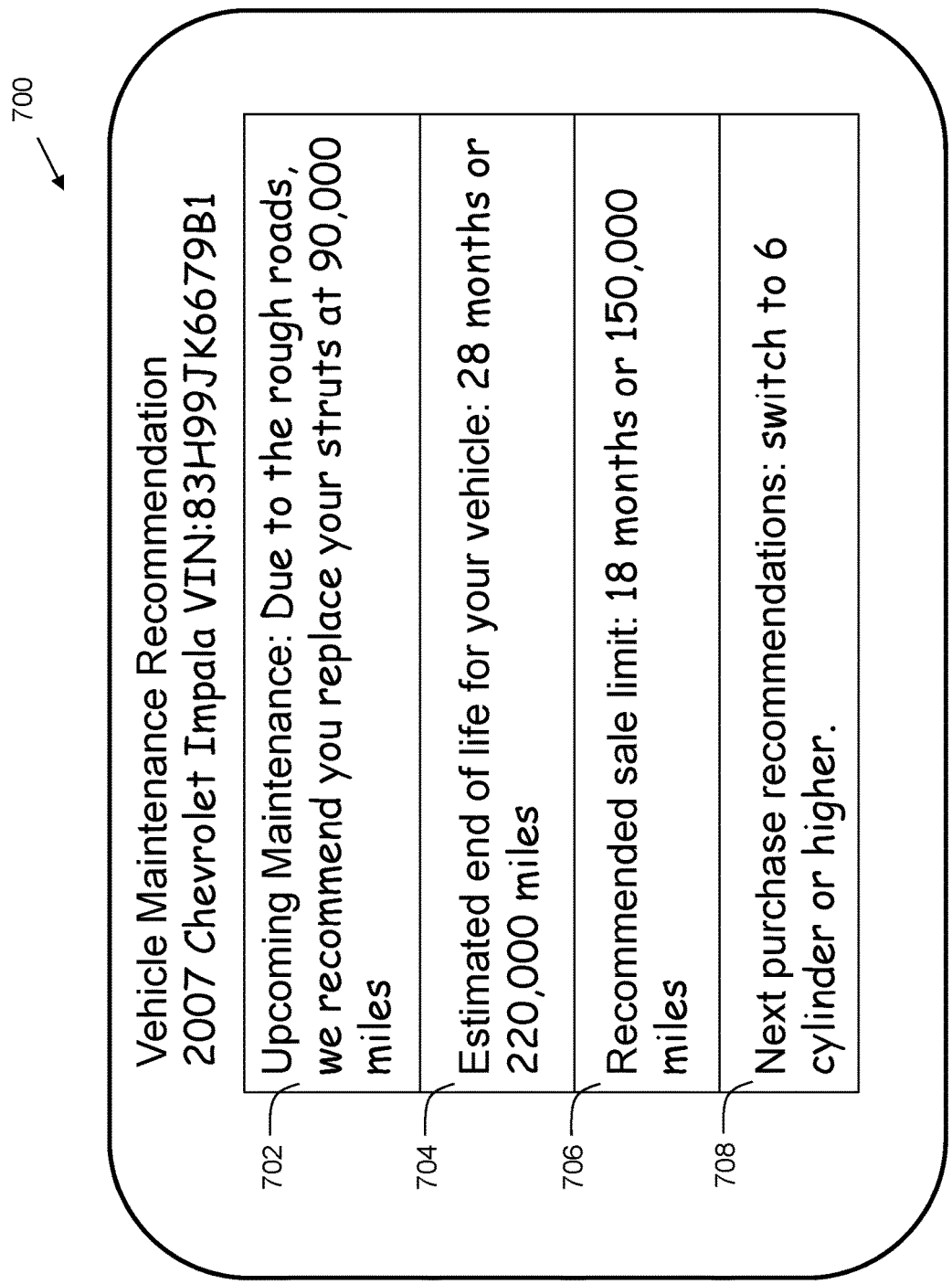
FIG. 7 shows an exemplary user interface in accordance with embodiments of the present invention.

FIG. 7 shows an exemplary user interface 700 in accordance with embodiments of the present invention. This is a screen that may be shown on a computer screen of the vehicle (for example, on the vehicle dashboard), smartphone, or other computing device. The user interface includes at least one vehicular recommendation.

In some embodiments, the vehicular recommendation includes a maintenance schedule 702. In the example, at 702, the OEM recommends replacement of struts at 120K miles. However, embodiments, using the method of FIG. 5 disclosed herein, determined that the user carries a lot of weight in the car and drives on bumpy roads. Accordingly, due to potholes, and/or heavy payloads, the system advises an adjustment for earlier replacement at 90,000 miles. The recommendation may include a reason for the adjustment as shown at 702 "due to the rough roads," in the example. Thus, embodiments include obtaining a maintenance procedure for the vehicle (e.g., suspension service); adjusting an interval associated with the maintenance procedure based on the maintenance score (e.g., adjusting from 120K miles to 90K miles); and providing the adjusted interval in the vehicle report.

In some embodiments, the vehicular recommendation includes an estimated vehicle end of life at 704. This is an estimate of when vehicle may have its effective end of life. Embodiments may determine this using the method of FIG. 5. The estimation may be provided in the form of time and/or driving distance left. In the example, it is 28 months or 220,000 miles.

In some embodiments, the vehicular recommendation includes a vehicle sell recommendation at 706. It may be recommended to sell the vehicle at some predetermined distance before end of life so that the owner can recoup a sum of money greater than the value of a vehicle at its end of life or at least a number pre-specified by the user. This recommendation may be provided in the form of time and/or driving distance left. In the example, it is 18 months or 150,000 miles.

In some embodiments, the vehicular recommendation includes a vehicle purchase recommendation at 708. Attributes for a new vehicle purchase may be recommended based on the information collected for the current vehicle. For example, if it is detected that the user typically pushes a 4-cylinder vehicle to the maximum recommended RPM limit, a recommendation may be issued to replace with a 6 or 8-cylinder engine vehicle (as they have different limits and operating ranges than a 4-cylinder engine vehicle).

As can now be appreciated, disclosed embodiments provide techniques for generating vehicular recommendations based on driver habits. By utilizing driver habits, environmental conditions, and other operational parameters, maintenance recommendations can be adjusted accordingly. This can serve to improve vehicle reliability by performing maintenance before a critical failure occurs. Additionally, disclosed embodiments can reduce operating costs by prolonging maintenance in certain circumstances, such as when a vehicle is lightly used. Furthermore, recommendations to sell and/or purchase a vehicle can also be generated based on this data. In embodiments, a machine learning system such as a neural network is used to further refine the results. Over time, as the available dataset increases, the recommendations can change as the machine learning system adapts to the new input information. This can be especially useful for trucking companies, automobile rental companies, police forces, and other organizations that utilize large fleets of vehicles. Thus, disclosed embodiments can serve to reduce operating costs and increase reliability of vehicles.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for generating a vehicle report for a vehicle, comprising:
   obtaining static vehicular data for the vehicle;
   obtaining dynamic vehicular data for the vehicle;
   obtaining environmental data associated with the vehicle;
   computing a maintenance score from a summation of a number of parameter based calculations, each of the parameter based calculations utilizing a function that is specific to a particular parameter of the number of parameters based on the static vehicular data, dynamic vehicular data, and environmental data;
   obtaining a maintenance procedure for the vehicle, the maintenance procedure having a static recommendation point for performing the maintenance procedure, the static recommendation point including at least one of a fixed time interval or a fixed interval of elapsed vehicle miles;
   adjusting an interval associated with the maintenance procedure based on the maintenance score; and
   providing the adjusted interval in the vehicle report.

2. The method of claim 1, wherein the obtaining of the environmental data includes obtaining ambient temperature data.

3. The method of claim 1, wherein the obtaining of the environmental data includes obtaining ambient humidity data.

4. The method of claim 1, wherein the obtaining of the environmental data includes obtaining airborne salinity data.

5. The method of claim 1, wherein the obtaining of the environmental data includes obtaining terrain data, the terrain data including crowdsourced road data regarding road conditions.

6. The method of claim 1, wherein the obtaining of the environmental data includes obtaining altitude data.

7. The method of claim 1, wherein the obtaining of the environmental data includes obtaining storage data.

8. The method of claim 1, wherein the obtaining of the dynamic vehicle data includes obtaining suspension deflection data from a device onboard the vehicle that collects data pertaining to how much a suspension is compressed during operation of the vehicle by a user.

9. The method of claim 8, wherein the obtaining of the suspension deflection data includes obtaining average suspension deflection data.

10. The method of claim 8, wherein the obtaining of the suspension deflection data includes obtaining significant deflection event data.

11. The method of claim 1, wherein the obtaining of the dynamic vehicle data includes obtaining engine data.

12. The method of claim 11, wherein the obtaining of the engine data includes obtaining average revolutions-per-minute data.

13. The method of claim 11, wherein the obtaining of the engine data includes obtaining average idle time data.

14. The method of claim 1, further comprising:
   obtaining unscheduled maintenance data;
   inputting unscheduled maintenance data into a machine learning system as training data;
   inputting the static vehicular data, dynamic vehicular data, and environmental data for the vehicle into the machine learning system; and generating a vehicular recommendation for the vehicle for by the machine learning system.

15. The method of claim 14, wherein the vehicular recommendation includes a maintenance schedule.

16. The method of claim 14, wherein the vehicular recommendation includes a vehicle sell recommendation.

17. The method of claim 14, wherein the vehicular recommendation includes a vehicle purchase recommendation.

18. An electronic computing device comprising:
a processor;
a memory coupled to the processor, the memory containing instructions, that when executed by the processor, perform the steps of:
obtaining static vehicular data for a vehicle;
obtaining dynamic vehicular data for the vehicle;
obtaining environmental data associated with the vehicle;
computing a maintenance score from a summation of a number of parameter based calculations, each of the parameter based calculations utilizing a function that is specific to a particular parameter of the number of parameters based on the static vehicular data, dynamic vehicular data, and environmental data;
obtaining a maintenance procedure for the vehicle, the maintenance procedure having a static recommendation point for performing the maintenance procedure, the static recommendation point including at least one of a fixed time interval or a fixed interval of elapsed vehicle miles;
adjusting an interval associated with the maintenance procedure based on the maintenance score;
obtaining unscheduled maintenance data;
inputting the unscheduled maintenance data into a machine learning system as training data;
inputting the static vehicular data, dynamic vehicular data, and environmental data for the vehicle into the machine learning system; and
generating a vehicular recommendation for the vehicle from the machine learning system.

19. The electronic computing device of claim 18, wherein the memory further comprises instructions, that when executed by the processor, perform the step of including a vehicle sell recommendation in the vehicular recommendation.

20. A computer program product for an electronic computing device comprising a computer readable storage medium having program instructions embodied therewith, the program instructions executable by a processor to cause the electronic computing device to:
obtain static vehicular data for a vehicle;
obtain dynamic vehicular data for the vehicle;
obtain environmental data associated with the vehicle;
compute a maintenance score from a summation of a number of parameter based calculations, each of the parameter based calculations utilizing a function that is specific to a particular parameter of the number of parameters based on the static vehicular data, dynamic vehicular data, and environmental data;
obtain a maintenance procedure for the vehicle, the maintenance procedure having a static recommendation point for performing the maintenance procedure, the static recommendation point including at least one of a fixed time interval or a fixed interval of elapsed vehicle miles;
adjust an interval associated with the maintenance procedure based on the maintenance score;
obtain unscheduled maintenance data;
input the unscheduled maintenance data into a machine learning system as training data;
input the static vehicular data, dynamic vehicular data, and environmental data for the vehicle into the machine learning system; and
generate a vehicular recommendation for the vehicle from the machine learning system.

* * * * *